US011372859B2

(12) United States Patent
Liu et al.

(10) Patent No.: US 11,372,859 B2
(45) Date of Patent: Jun. 28, 2022

(54) EFFICIENTLY SUPPORTING VALUE STYLE ACCESS OF MOBS STORED IN SQL LOB COLUMN BY PROVIDING VALUE BASED SEMANTICS FOR LOBS IN RDBMS (71) Applicant: Oracle International Corporation, Redwood Shores, CA (US)

(72) Inventors: Zhen Hua Liu, San Mateo, CA (US); Geeta Arora, Union City, CA (US); Sriram Krishnamurthy, San Francisco, CA (US); Sneha Chandrababu, San Mateo, CA (US); Sunitha Subramanyam, Redwood Shores, CA (US)

(73) Assignee: Oracle International Corporation, Redwood Shores (CA)

( * ) Notice: Subject to any disclaimer, the term of this patent is extended or adjusted under 35 U.S.C. 154(b) by 62 days.

(21) Appl. No.: 16/570,356

(22) Filed: Sep. 13, 2019

(65) Prior Publication Data

US 2021/0081421 A1    Mar. 18, 2021

(51) Int. Cl.
G06F 17/30 (2006.01)
G06F 16/2455 (2019.01)
G06F 16/22 (2019.01)
G06F 16/28 (2019.01)

(52) U.S. Cl.
CPC ...... G06F 16/24553 (2019.01); G06F 16/221 (2019.01); G06F 16/284 (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| 6,012,067 | A  | * | 1/2000  | Sarkar ............... G06F 16/252 |
| 2001/0023420 | A1 | * | 9/2001 | Dong ............. G06F 16/24561 |
| 2004/0167879 | A1 | * | 8/2004 | Cotner ............. G06F 16/2219 |
| 2008/0243945 | A1 | * | 10/2008 | Hanus .............. G06F 16/2358 |
| 2014/0280249 | A1 | * | 9/2014 | Marwah ........... G06F 16/2219 707/754 |
| 2018/0060362 | A1 |   | 3/2018 | Lakshminarayanan et al. |
| 2019/0102450 | A1 |   | 4/2019 | Liu et al. |

OTHER PUBLICATIONS

"Oracle 9i Application Developer's Guide—Large Objects (LOBs)", From Oracle 9i, Jun. 2001.
"LOB Value and Locators" from Oracle 9i Application Developer's Guide, Jun. 2001.

* cited by examiner

*Primary Examiner* — Hung D Le
(74) *Attorney, Agent, or Firm* — Vista IP Law Group, LLP (57) ABSTRACT Described are improved systems, computer program products, and methods for an improved approach to access small to medium size objects (MOBs) stored in LOB data type columns of a RDBMS. The approach includes receiving a SQL statement comprising a retrieval of a large object (LOB). The approach also includes determining whether to return a value of the LOB or a reference to a storage location storing the value of the LOB based on: a data dictionary property of the LOB to return the value of the LOB, a function included in the SQL statement to return the value of the LOB, or a flag derived from a SQL operator tree propagation to return the value of the LOB.

20 Claims, 7 Drawing Sheets

EFFICIENTLY SUPPORTING VALUE STYLE ACCESS OF MOBS STORED IN SQL LOB COLUMN BY PROVIDING VALUE BASED SEMANTICS FOR LOBS IN RDBMS

FIELD

This disclosure concerns a method, a computer program product, and a computer system for providing value style access of medium size application objects (MOBs) stored in Large Object (LOB) data type columns in a relational database system.

BACKGROUND

A relational database management system (RDBMS) controls the storage, organization, and retrieval of data stored in relational databases located at one or more database servers. The database server(s) may be interconnected by a network, which may also connect one or more clients (e.g., workstations, personal computers, or remote computing terminals). Clients may submit SQL statements via the network to perform various tasks in a relational database. There are different types of SQL statements to perform the various tasks in the relational database. For example, clients may manage database objects such as tables, views, etc. using data definition language (DDL) statements (e.g., create schema objects, alter schema objects, drop schema objects, grant and revoke privileges, etc. that result in data dictionary property change(s). As another example, clients may access data stored in the database schema objects (e.g., tables, views, etc.) using SQL query statements (e.g., SELECT SQL statements).

Due to the increasing number of content-rich applications, as well as the growth of the Internet, an increasingly common data type used to store large amounts of semi-structured and unstructured data in relational databases is the Large Object (LOB) data type. LOB data types in SQL were initially designed to cover large data of size ranging from megabytes to terabytes. A LOB data type column can store up to terabytes of data in the RDBMS while the standard VARCHAR and VARCHAR2 data types can only store up to 4 KB and 32 KB, respectively. Thus, LOBs are optimized for large size data and random reads and writes.

Conventionally, accessing LOB data stored within a relational database system is via an approach which is hereinafter referred to as "Reference based." Reference based access is different than accessing other data types such as INT, CHAR, VARCHAR, VARCHAR2, etc. of the RDMS because of the mere size of the LOB data (e.g., greater than 32 KB). For example, Reference based access of LOB data uses a lob locator that includes information generated to provide a client with a reference to a storage location of the LOB data so that the client may access and retrieve the large amount of data in multiple accesses—unlike accessing the other data type such as INT, CHAR, VARCHAR, VARCHAR2 which returns the actual data to the client, not a reference to a storage location of the data.

Recently, there has been an increasing number of LOB use cases where a user attempts to use LOBs similar to a large varchar/raw data type because the user cannot guarantee that all of their data will fit into the varchar/raw (e.g., 32 KB max) columns. In other words, users want varchar/raw kind of semantics and performances, but are forced to use LOBs because of the size limitations of varchar/raw. The user essentially wants usage of LOBs to behave similar to a large varchar and have fetch performance on par with varchars/raw. This is the Medium size Object (MOB) use case. As RDBMS are being leveraged more and more to support NoSQL style applications that store MOBs inside LOB columns, the current RDBMS method of using lob locators for accessing the LOB columns is rather expensive and cumbersome.

Currently, many NoSQL applications are designed and developed to use non-RDBMS based products to support the NoSQL style applications without the need of LOB. Users who want to use RDBMS based products to store NoSQL style data are forced to live with Reference based semantics for LOBs with all the inefficiency associated with the LOBs (e.g., LOB locators, etc.).

Furthermore, maintaining long running instances of LOB locators through client access can lead to resource leakages if the client forgets to close the LOB locator properly. For example, conventionally, when a client accesses a LOB, the client executes a SQL statement that selects a LOB column. The RDBMS returns a lob locator to the client. The lob locator form serves as a reference to a storage location of the LOB data. The location of the LOB data may be either a physical storage location of the LOB data or in some situations when, for example, a substring portion of the lob column is requested (e.g., a portion of the LOB data or a calculation was performed on the LOB data that modifies the LOB data slightly for the purpose of the query), the substring portion of the LOB data is stored in a temporary memory, temporary table space, or temporary LOB, hereinafter referred to collectively as "temporary memory," for the client to access the substring portion of the LOB data using the lob locator information sent to the client.

As part of how the LOB s were designed, the temporary memory will not be released or closed by the RDBMS (e.g., garbage collected) unless the client either explicitly closes the LOB locator or the client session is terminated, at which point, the temporary memory is cleared. Because of the way lob locators conventionally operate, RDBMS garbage collectors will not garbage collect open temporary memories of LOB data (e.g., temporary LOB). This is because the client is expected to return to the temporary memories to access the substring portion of the LOB data. Therefore, if the client forgets to close out the LOB locator or does not disconnect from the session, the temporary memory will remain open, thus resulting in excessive memory leakage over time.

Therefore, what is needed is a technique or techniques to improve over various considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

According to some embodiments, described are improved systems, computer program products, and methods for providing an approach for an RDBMS client to indicate, when querying LOB data type columns in the RDBMS, whether to receive the LOB data or a reference to the LOB data.

In one embodiment, the method may include receiving a SQL statement that includes a retrieval request of a large object (LOB) such that the LOB is data type column in a relational database system (RDBMS). The method may also include determining whether to return a value of the LOB or a reference to a storage location storing the value of the LOB based at least in part on at least one of: a data dictionary property of the LOB to return the value of the LOB, a function included in the SQL statement to return the value of the LOB, or a flag derived from a SQL operator tree propagation to return the value of the LOB. The method may additionally include upon determination that the value of the LOB is to be returned, executing the SQL statement to retrieve the value of the LOB.

In one or more embodiments, a small to medium size object is stored in the LOB. The data dictionary property of the LOB is configured based at least in part on a data definition language (DDL) statement. The DDL statement is an alter table command or a create table command. The flag is a value lob flag derived from a SQL operator tree propagation. The function is included in a select statement and/or a where clause of the SQL statement. A lob locator and a portion of the value of the LOB is returned when a data size of the LOB is larger than a pre-fetch buffer size of a client. A temporary LOB is garbage collected upon completion of a row level fetch of the value of the LOB stored in the temporary LOB.

Further details of aspects, objects and advantages of the disclosure are described below in the detailed description, drawings and claims. Both the foregoing general description and the following detailed description are exemplary and explanatory, and are not intended to be limiting as to the scope of the disclosure.

BRIEF DESCRIPTION OF FIGURES

The drawings illustrate the design and utility of some embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the disclosure, a more detailed description of the present disclosure briefly described above will be rendered by reference to specific embodiments thereof, which are illustrated in the accompanying drawings. Understanding that these drawings depict only typical embodiments of the disclosure and are not therefore to be considered limiting of its scope.

The drawings use like reference numerals to identify like elements. A letter after a reference numeral, such as "120a," indicates that the text refers specifically to the element having that particular reference numeral. A reference numeral in the text without a following letter, such as "120," refers to any or all of the elements in the drawings bearing that reference numeral (e.g. "120" in the text refers to reference numerals "120a" and/or "120b" in the drawings). The disclosure will be described and explained with additional specificity and detail through the use of the accompanying drawings in which.

DETAILED DESCRIPTION

Various embodiments will now be described in detail, which are provided as illustrative examples of the disclosure so as to enable those skilled in the art to practice the disclosure. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the disclosure. Further, various embodiments encompass present and future known equivalents to the components referred to herein by way of illustration.

Overview

As previously noted, conventionally accessing LOBs requires a lob locator to be generated and returned to the client by the RDBMS. Then the client can use information within the lob locator to actually access the LOB data. The problem is, sometimes, the lob locator presents an extra step that the client needs to perform to actually access the LOB data (e.g., retrieving first the lob locator and then using the lob locator to actually retrieve the LOB data), especially when the data that is stored inside the LOB is small enough such that the data itself may be returned to the client instead of the lob locator.

The present disclosure provides an improved approach to accessing small to medium size objects (MOBs) stored in LOB data type columns in an RDBMS. Some embodiments are directed to improved systems, computer program products, and methods for enhancing DDL statements and SQL query statements for an RDBMS client to access LOB data types with varchar/raw kind of semantics and performances. In particular, the client may indicate in a DDL statement or SQL query statement how the client would like to access the data stored in a LOB data type column (e.g., Value based or Reference based).

It is to be noted that the present disclosure does not change the current underlying storage mechanisms of a LOB in the RDBMS. The present disclosure provides a soft approach to indicate how to retrieve data from LOB data type columns by changing the approach to retrieve data from LOBs (e.g., Value based vs Reference based). A client may indicate how the client may want to retrieve data from LOBs in at least two different ways: (1) at a database object level using DDL statements to change a data dictionary property of, as an example, a table and/or view; or (2) at SQL runtime as specified by a special function included in a SQL query on a table and/or view that may or may not be defined as Value based processing.

Definitions

Some of the terms used in this description are defined below for easy reference. The presented terms and their respective definitions are not rigidly restricted to these definitions—a term may be further defined by the term's use within this disclosure. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXAMPLE EMBODIMENTS

Assigning Value Based Semantics in a SQL Query Statement

In some embodiments, a LOB column of a relational database table may be configured/defined as a conventional LOB column (e.g., using Reference based semantics). However, when a client wants to access the LOB column, the client may include a special construct (e.g., a SQL operator, a SQL function, etc. that may be included in a SQL statement) in a SQL query statement such as, for example, "LOB_VALUE (lob_col_name)", where the lob_col_name parameter is the column name of the LOB and "LOB_VALUE ( )" is the special construct that the client includes in a select statement and/or where clause of the SQL query statement to indicate to the RDBMS that the client would like the RDBMS to by-pass the conventional approach of (1) setting up a lob locator for the query, (2) sending the lob locator back to the client so that the client is required to (3) submit a second request to actually access the LOB data. For example, the SQL query statement may be illustrated as:

"SELECT LOB_VALUE (lob_col_name) FROM
    table T;"    (SQL query statement #1).

In these embodiments, the RDBMS query optimizer may receive a SQL query statement such as, for example, SQL query statement #1. The query optimizer may generate an execution plan for accessing the LOB data type differently from how the query optimizer may conventionally generate an execution plan for accessing conventional LOB data types using Reference based semantics. The optimizer may perform a further check corresponding to data size and pre-fetch buffer sizes of a client to make sure a Value based semantic returning the data stored in the LOB in one response may be possible for the particular SQL query statement #1, and if the checks are cleared, then the generated execution plan for the Value based semantics for accessing the LOB will be used to return the value of the MOB to efficiently access the MOB stored in the LOB—instead of returning a reference to the storage location of the value of the MOB (e.g., Reference based semantics). Since the special construct to the SQL query statement (e.g., LOB_VALUE ( )) may be a SQL operator, the special construct may be included anywhere a SQL operator may be allowed, including in a SELECT list of a SQL statement and/or a "WHERE" clause of the SQL Statement.

Figure 1A:
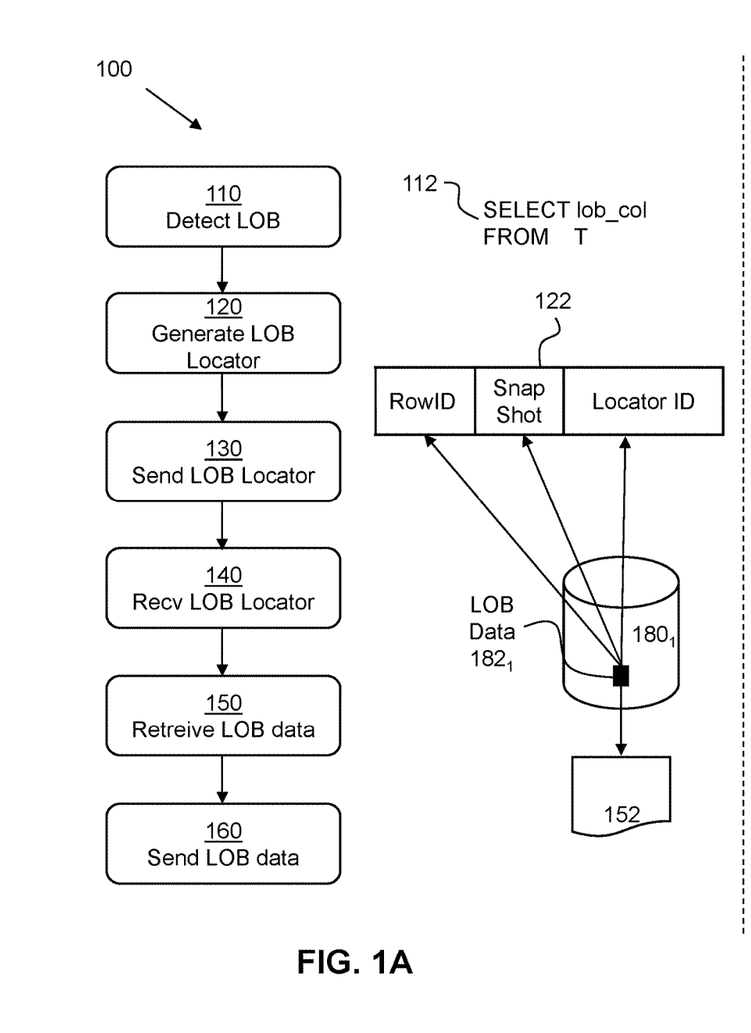
FIG. 1A illustrates a conventional multi-step access of a LOB data type column in an RDBMS using Reference based semantics.

FIG. 1A illustrates a conventional multi-step access 100 of a LOB data type column in an RDBMS using Reference based semantics. Specifically, FIG. 1A depicts a flow that can commence with detecting a SQL query statement having an access statement request that is directed to, or includes, a LOB column as shown at 110. SQL query statement 112 is a simple query statement for selecting a data value of a lob column "lob_col" from a table "T". Conventionally, an execution plan created by a SQL optimizer would automatically generate a LOB locator to identify a storage location of the LOB data type column (e.g., lob_col) as shown at 120.

LOB locator 122 may be generated as shown at 120 to provide information (e.g., handles) for a client to be able to access the LOB data at the location as specified by the lob locator 122 at a later time after the SQL statement executes. This is because the LOB data type is designed and implemented with the notion that since the data stored inside a LOB column is large (e.g., exceeding 32 KB, 4 GB, or even terabytes in size in some cases), an efficient way to allow a client access to the large data is to send the client a lob locator 122 instead of the LOB data itself. This way, the client may access the LOB data as many time(s) as necessary to extract/consume/access the large object. By sending the lob locator 122 to the client, the client may continue to access the LOB to extract/access more data from the LOB at a later time. For example, a movie file having a size of 4 GB may be stored as a LOB. When a user accesses the movie file, instead of returning the entire 4 GB to the user at once in response to a client access request of the movie file, the client is returned the lob locator 122. The client may then use the access information included within the lob locator 122 to make puts and gets type of commands to access the content of the movie file stored at the location identified by the Locator ID of the lob locator 122. This way, the client may continuously access the LOB data using the lob locator well after the SQL statement to access the movie file has been executed and completed.

Lob locator 122, as an example, may include for a particular row corresponding to the select statement of SQL statement 112, a unique rowID, a snapshot version of the database table of a relational database 180₁ storing the LOB data 182₁ at the time the SQL statement is executed. Additionally, lob locator 122 also include a Locator ID referencing the location of the LOB data stored either at the database table or another storage location on the RDBMS or externally at another storage device/space outside of the RDBMS. The information necessary to generate the lob locator 122 is determined by accessing the relational database 180₁ to identify the LOB Data 182₁ to retrieve a reference (e.g., Locator ID) to the location of the LOB data itself to generate the lob locator 122, as indicated by the three arrows pointing from the lob data 182₁ to the lob locator 122.

The LOB locator 122 is sent back to the client executing the SQL statement as shown at 130. The client may execute further commands, as shown at 140, to actually access the LOB data 182₁ using information obtained from the lob locator 122. For example, the RDBMS may receive an access request using lob locator 122 to access the LOB data 182₁ stored at the RowID of a particular snapshot of, as an example, the database table storing the LOB data at the moment the SQL statement 112 was executed.

At 150, the RDBMS retrieves the LOB data $182_1$ from the actual storage location of, in this example, relational database $180_1$, as specified in the lob locator 122 sent to the client at 130. At 160, a copy of the lob data 152 is generated and sent to the client. As it can be seen, the conventional approach of access LOB columns via the conventional Reference based semantic requires additional overhead costs of generating a lob locator, sending the lob locator to the client, receiving a second request by the client to access the data based on information of the lob locator, and finally sending the actual LOB data itself to the client. While this conventional approach is appropriate for LOB columns storing large objects, the conventional approach may not be the most efficient process to access MOBs stored in the LOB columns.

Figure 1B:
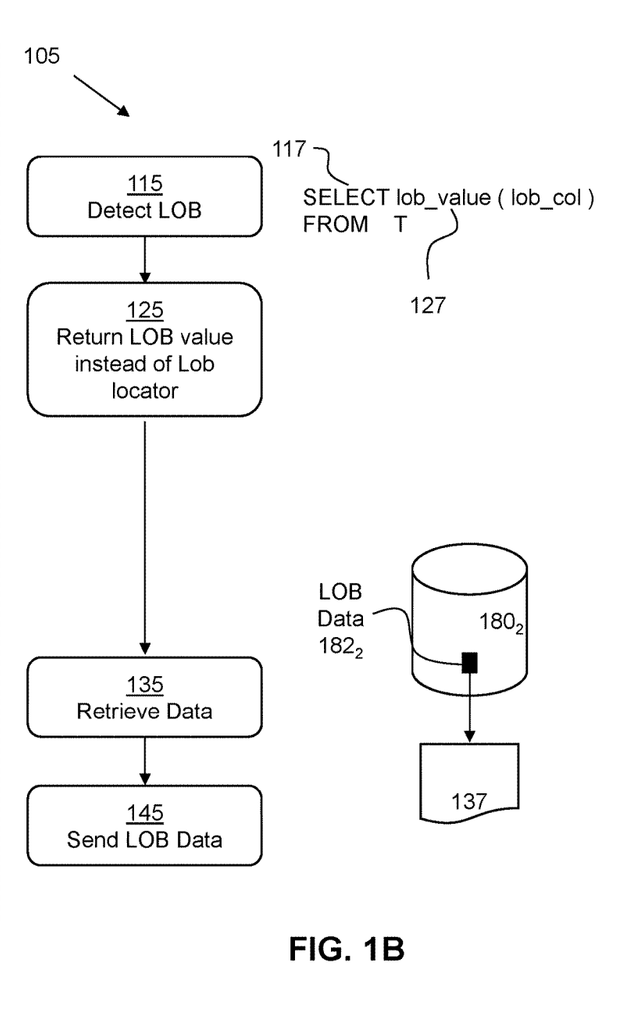
FIG. 1B illustrates an efficient access of the LOB data type column using a SQL query statement, according to some embodiments of the present disclosure.

FIG. 1B illustrates an efficient access technique 105 of the LOB data type column using a SQL query statement, according to some embodiments of the present disclosure. Specifically, according to the herein disclosed techniques, the efficient access technique of the LOB data type column may commence with detecting a SQL statement having an access statement request that is directed to, or includes, a LOB column as shown at 115. SQL query statement 117, for explanatory purposes, may be a simple query statement for selecting a data value of a lob column "lob_col" from a table "T". Instead of conventionally generating a LOB locator to identify a storage location of the LOB data type column (e.g., lob_col) as detected at 115, the present technique instead makes a determination of whether Value based or Reference based semantics should be associated to the access request of the LOB, as shown at 125.

At 125, an inspection of the SQL query statement 117 may quickly identify a special construct/function in the SQL statement that indicates the client would like to have the RDBMS return the LOB value (e.g., actual data value of the LOB using Value based semantics) instead of a lob locator (e.g., a reference to the storage location of the LOB using Reference based semantics). For example, the special construct 127 (e.g., LOB_VALUE ( )), indicates that the client intends to access the LOB column using Value based semantics as opposed to Reference based semantics. In some embodiments, the SQL optimizer (not shown in the figures) may also inspect a data dictionary that describes the LOB column to determine whether the default query setting of the lob_col column is set for Reference based or Value based (as set by, as an example, a DDL statement). If both the SQL query statement and the data dictionary does not explicitly set the lob_col as Value based, the SQL optimizer may treat the SQL statement as Reference based. However, SQL query statement 117 includes the special construct 127 of "LOB_VALUE ( )" to indicate that the client would like to access lob_col using Value based semantics.

Since it is determined at 125 that the SQL query statement 117 includes an indication that the client intends to access the data stored in the lob_col as Value based semantics (e.g., as indicated by the special construct of LOB_VALUE( )in the SQL statement), the execution plan retrieves the LOB data $182_2$ from relational database $180_2$ as shown at 135, represented as fetched LOB data 137 to return/send to the client at 145 without going through the extra steps of creating a lob locator (e.g., 122) and sending the lob locator back to the client so that the client can send a second request to actually access the LOB data $182_1$. The Value based approach of accessing MOBs stored in LOB data types may be as efficient as accessing a normal VARCHAR or VARCHAR2 datatype from the RDBMS.

Note, with Value based semantics, once LOB data of a LOB data type column is fetched/retrieved for a particular row of a temporary LOB, garbage collection of the temporary LOB may be performed once the LOB data for the particular row of the temporary LOB is completed. This is because since there are no intentions of the client to re-access the temporary LOB to retrieve/fetch more LOB data (e.g., the LOB data is fetched and returned to the client in one response), garbage collection may be performed on the temporary LOB once the LOB data in the temporary LOB is fetched, thus improving over the conventional approach of handling LOBs where clients forget to close the lob locator or disconnect from the client session to prevent the memory leakage issues associated to Reference based retrieval semantics of LOBs.

Defining Value Based Semantics for a Lob Column in a Data Dictionary using a Data Definition Language (DDL) Statement In some embodiments, a client may simply define a LOB column of a relational database object (e.g., schema object such as a database table) as having a default query to be set as Value based. In these embodiments, a client may create or update a relational database schema object (e.g., a database table) by executing a DDL statement. For example, the DDL statement may be illustrated as:

CREATE TABLE <tab>( . . . ) LOB (L1) QUERY
    AS [VALUE|REFERENCE];            (DDL Statement #1).

The DDL statement #1 is an example of a create table command/statement for a client to create table "tab" having various columns including LOB data type column "L1" having a query default setting to use either Value based or Reference based semantics. Additionally, another DDL statement may alter a table to change a LOB data type column to be either Value based or Reference based.

ALTER TABLE <tab>( . . . ) LOB (L1) QUERY AS
    [VALUE|REFERENCE];               (DDL Statement #2).

DDL statement #2 is an example of an alter table command/statement to change the default query setting for the LOB data top column "L1" to use either the Value based semantics or the Reference based semantics.

When a LOB column has the query default set to Value based, a SQL query statement selecting the LOB column may be treated by the query optimizer as a Value based semantic when generating the execution plan for the SQL query statement. However, when the query default setting for the LOB column is Reference based, a client may override the default query setting by including the special construct, as an example, "LOB_VALUE (L1)" to indicate that for that particular SQL query statement, the client would like to access the L1 LOB column using Value based semantics, regardless of whether the underlying definition of the L1 LOB column has a default query setting of either Value based or Reference based. In other words, in the event of a conflict between a SQL query statement and a data dictionary property setting of the LOB column, the SQL query statement may take precedence. For example, if the default query setting for the L1 column is Reference based and the SQL query statement includes the Value based special construct, the query optimizer will generate an execution plan using the Value based semantics. Additionally, if the default query setting for the L1 column is already set as Value based and the SQL query statement includes the Value based special construct, the query optimizer will generate an execution plan using the Value based semantics.

Propagating Value Based Flag Up and Down an Operator Chain

In yet other embodiments, once a LOB column has been indicated as Value based in a particular SQL statement at runtime (e.g., using the special function/construct to indicate Value based semantics) or as a data definition, e.g., as a column level of a database table, any embedded queries, sub queries, inner queries, subsequent queries, etc. associated to the SQL statement should also access the LOB column as Value based as well by checking a value LOB flag derived via a SQL operator tree propagation. For example, a SQL operation level (e.g., via a SQL query statement having one or more embedded query statement(s)) may set this value LOB flag associated to the LOB data type column to inform the other embedded queries of the SQL query statement to use Value based semantics. For example, a subquery may set this value LOB flag associated to the LOB column when at least one of the LOB column is explicitly set as Value based by, as an example, the special function (e.g., lob_value( )).

"SELECT lob_value(lob_col) FROM t WHERE
    lob_col IN (SELECT lob_col FROM t WHERE
        x=10);                              (SQL query statement #2).

During query optimization, it may be determined that lob_col is Value based, because of the special function/construct (e.g., lob_value( )) in the SELECT statement for the LOB column lob_col. Because lob_col is set to Value based by the SQL query statement, a value lob flag may be set to Value based for the lob_col column to inform the subquery (e.g., SELECT lob_col FROM t WHERE x=10) to use the lob_col within its subquery, as Value based as well.

The special function/construct (e.g., lob_value ( )) operator may occur anywhere in a query. For example, a create view may use the same query optimizations for propagating the Value based semantics. The following create view statement may be illustrated as:

"CREATE VIEW vv(vlob) as SELECT lob_value
    (tlob) from t"                          (SQL query statement #3).

During query optimization, it may be determined the vlob view column of view vv is Value based because the SELECT statement is using the lob_value( ) function when retrieving the LOB column tlob from table t. Because view vv has been created as Value based, a data dictionary property for the vlob column of view vv may be set as Value based. Thus, when a subsequent SQL query statement, such as, for example, "SELECT substr(vlob, 10, 100000) from vv" is executed, the same query optimization may mark a value lob flag for the substr(vlob) to be retrived as Value based.

Therefore, if a particular SQL query is accessing the LOB column using a Value based semantics, having the value lob flag set correctly may inform other queries (e.g., down the operator chain or up the operator chain) to also access the LOB data/LOB column as Value based and not Reference based. In some embodiments, once Value based semantics is used for a particular LOB column, the value LOB flag indicating the LOB column is being used as Value based may be associated with a results of the LOB data that is returned to the client to inform the embedded queries, sub queries, inner queries, or subsequent queries up and/or down the operator stack to treat processing of the LOB column as Value based instead of Reference based. One of the purposes of the value lob flag may be to provide notification to other sub queries, inner queries, etc. for consistent accessing of the LOB data.

Figure 2:
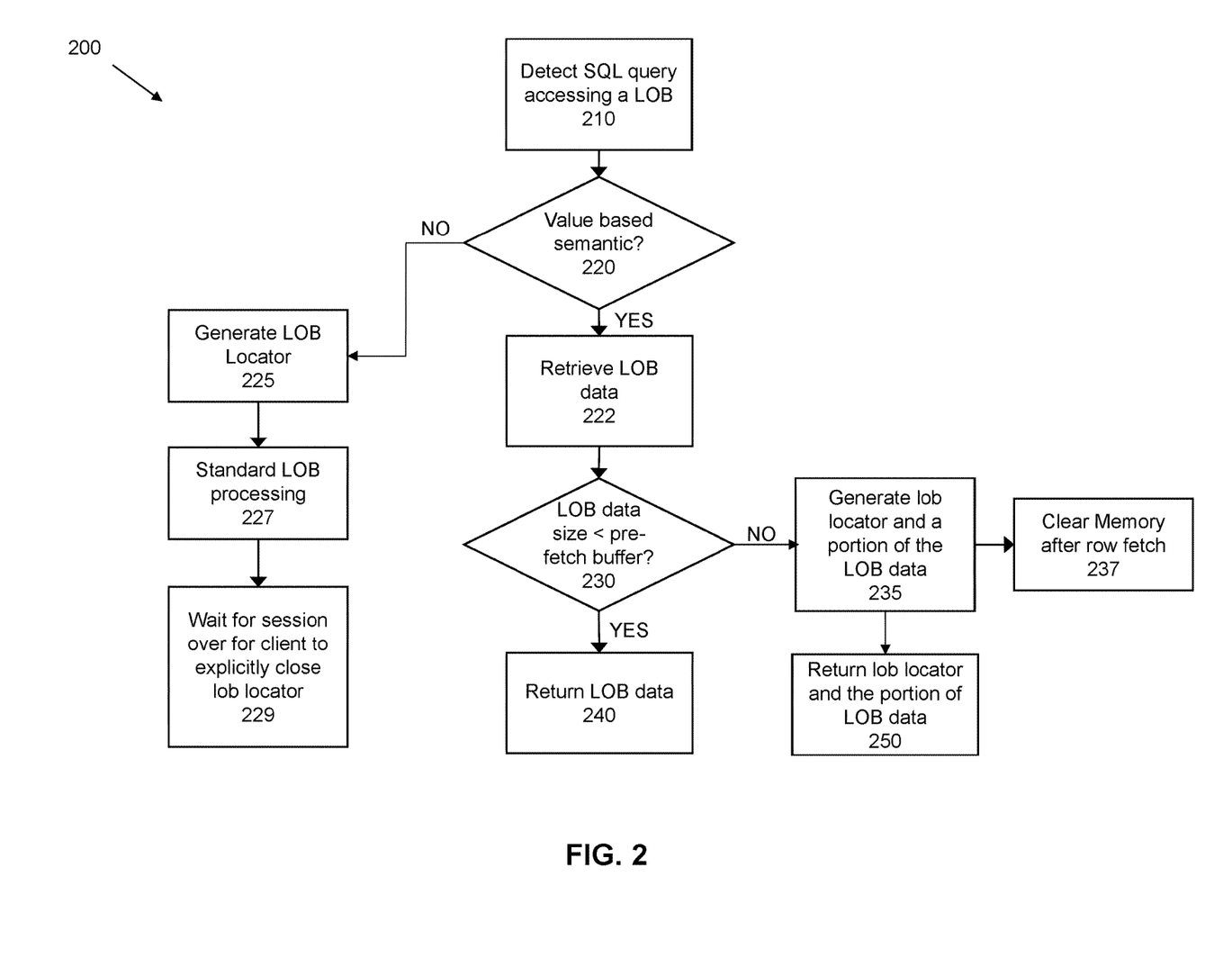
FIG. 2 shows a high-level flowchart of an approach to implement some embodiments of the present disclosure.

FIG. 2 shows a high-level flowchart 200 of an approach to implement some embodiments of the present disclosure. A SQL statement may be received and analyzed by a SQL/query optimizer to generate an execution plan for the SQL statement. The optimizer may detect, within the SQL statement, a query that access a LOB data type column as shown at 210.

At 220, the SQL/query optimizer may determine whether the LOB column being accessed is using Value based semantics (e.g., the query returns the data value of the LOB data stored in the LOB column) or a Reference based semantics (e.g., the query returns a lob locator that references a storage location of the LOB data associated to the LOB column). To make this determination, the SQL/query optimizer may check at least three different configurations to determine whether or not Value based or Reference based semantics should be used to return an access result to the entity executing the SQL statement. (1) Check a data dictionary property associated with the LOB column to determine whether the data dictionary property has been set to Value based; (2) Check the SQL query statement to determine whether a special function/construct (e.g., LOB_VALUE ( )) was used in the query statement to indicate that the client would like to use Value based semantics when accessing the LOB data; or (3) Check a value flag to determine whether a LOB producing operator within an operating stack has set the value flag to use Value based semantics. As long as at least one of the three configurations indicated that Value based semantics should be used, the SQL/query optimizer may generate an SQL execution plan for the SQL statement as Value based.

As discussed above, a query accessing data stored in a LOB data type column conventionally will result in a lob locator being generated by the RDBMS and returned to the client executing the query. The client, conventionally, would have to make a second call to the RDBMS to retrieve the actual LOB data value using information contained within the lob locator. This conventional approach of generating a lob locator for the initial access request is to provide the client the ability to continually return to the LOB data value location to extract more LOB data values from the storage location since the LOB data size may be too large to fetch/extract in one operation. For example, a LOB column storing a movie file having a size of 4 GB would be an example case of a conventional use of the LOB data type column. Once a client receives the lob locator for the movie file, the client can access the movie file multiple times to extract/fetch data from the 4 GB file since the 4 GB file most likely would not fit into any pre-fetch buffer size specified by the client.

As discussed above, the LOB data type column may be used to store small to medium size objects (MOBs) ranging in size, for example, from 4 KB-32 KB+. To efficiently use the LOB data type column for storing MOBs, the present disclosure describes various improvement embodiments to alter/change the conventional access methods used to access LOB data values (e.g., Reference based semantics using lob locators).

If it is determined that Value based semantics has not been set or indicated by the SQL statement, a lob locator may be generated as shown at 225 so that the standard lob locator processing for a LOB data type column, as shown at 227, may be implemented to return the lob locator as the return result for the SQL statement. As one of the technical problems to be solved by the present disclosures, generating the lob locator and processing access to the LOB using the conventional approach may incur overhead associated with keeping the storage location of the LOB accessible in case the client may need to access the storage location to retrieve/fetch the LOB data value.

To make matters worse, when a LOB data value is stored in a temporary memory (e.g., because a portion of the LOB data value that is stored on a storage device is used or the LOB data value has been manipulated for a particular client session such that the lob locator is referencing the temporary memory/temporary LOB having the manipulated/calculated version of the LOB data value instead of the LOB data as stored in the storage device), the temporary memory/temporary LOB has to be maintained (e.g., kept available) until either the client session has terminated or the client has explicitly closed the lob locator, as shown at 229. This is because the conventional approach to access LOB data is Reference based semantics, which requires the temporary memory location to be maintained and available in case the client needs to access the particular rowID, snapshot version and locator ID of the temporary memory of the portion or calculated version of the LOB data value.

If it is determined that Value based semantics has been specified, then at 222, the LOB data is retrieved from the RDBMS. In some embodiments, a size of the LOB data may be checked as the LOB data is being fetched into a pre-fetch buffer of the client, as shown at 230, to determine whether the LOB data itself may be qualified to be returned as a result of the Value based semantics associated to the LOB by determining whether the size of the LOB data is less than a pre-fetch buffer size of the client executing the SQL statement.

For example, even though the SQL statement may include a LOB that has been indicated as being treated as Value based, a verification may be implemented while the LOB data is being fetched into a pre-fetch buffer of the client to confirm Value based treatment is possible for the particular SQL statement (e.g., returning the LOB data to the client in one response), or whether a hybrid Value based approach may be better suited (e.g., a lob locator having a reference to the LOB data and a portion of the LOB data that may fit inside the pre-fetch buffer). For example, a client may execute a SQL statement to select a LOB column that has been specified to store a max 32 KB. If the pre-fetch buffer size of the client is greater than the LOB data size, then it is determined that the LOB data value may be returned in one response to the client so that the data value of the LOB may be retrieved and returned to the client, as shown at 240.

However, if the client's pre-fetch buffer size is less than 32 KB, then the entire LOB data value (e.g., 32 KB) may not be included in the pre-fetch buffer of the client to include the entire LOB data value in the one/single response to the client. In this situation, as shown at 235, a hybrid Value based approach may be used where a lob locator may be generated such that the results for accessing the LOB may include a lob locator and a portion of the LOB data that may fit within the pre-fetch buffer size of the client—instead of the entire data value of the LOB.

At 250, the lob locator and the portion of the LOB data that may fit within the pre-fetch buffer of the client is returned to client. By receiving the lob locator and the portion of data of the LOB data, the client may be able to fetch the remaining portion(s) of the LOB data in a separate request to the RDBMS until all of the data for the LOB has been fetched.

In this embodiment, although the pre-fetch buffer size of the client is smaller than the column size of the LOB which results in a lob locator being generated, certain optimizations associated with Value based semantics may still be achieved as shown at 237. For example, although the LOB data may need to be fetched in more than a single transaction, upon completion of the fetching of the row corresponding to the LOB column that is being selected/operated upon, any memory associated with the fetching of the LOB data (e.g., lob locator, any temporary memory containing a portion of the LOB data, etc.) may be cleared by RDBMS once the LOB data has been completely returned to the client, which solves at least the memory leakage issues associated with the conventional approach for accessing LOB data. This is because the LOB column has been specified as Value based, which assumes that the client should not have any intention of accessing the LOB data in the particular row again since the LOB data corresponding to the particular row has already been completely returned to the client (e.g., either in a single response as shown in 240 or in one or more responses using the log locator as shown in 235). Thus, since there are no expectations for further access to the LOB data value corresponding to the row that is being fetched, computing resources relating to the fetching of the LOB data value may be released upon completion of the fetching of the LOB data value corresponding to the row that is fetched, thus fixing the problem of potential memory leakage as a result of accessing data stored in LOB data type columns.

Figure 3:
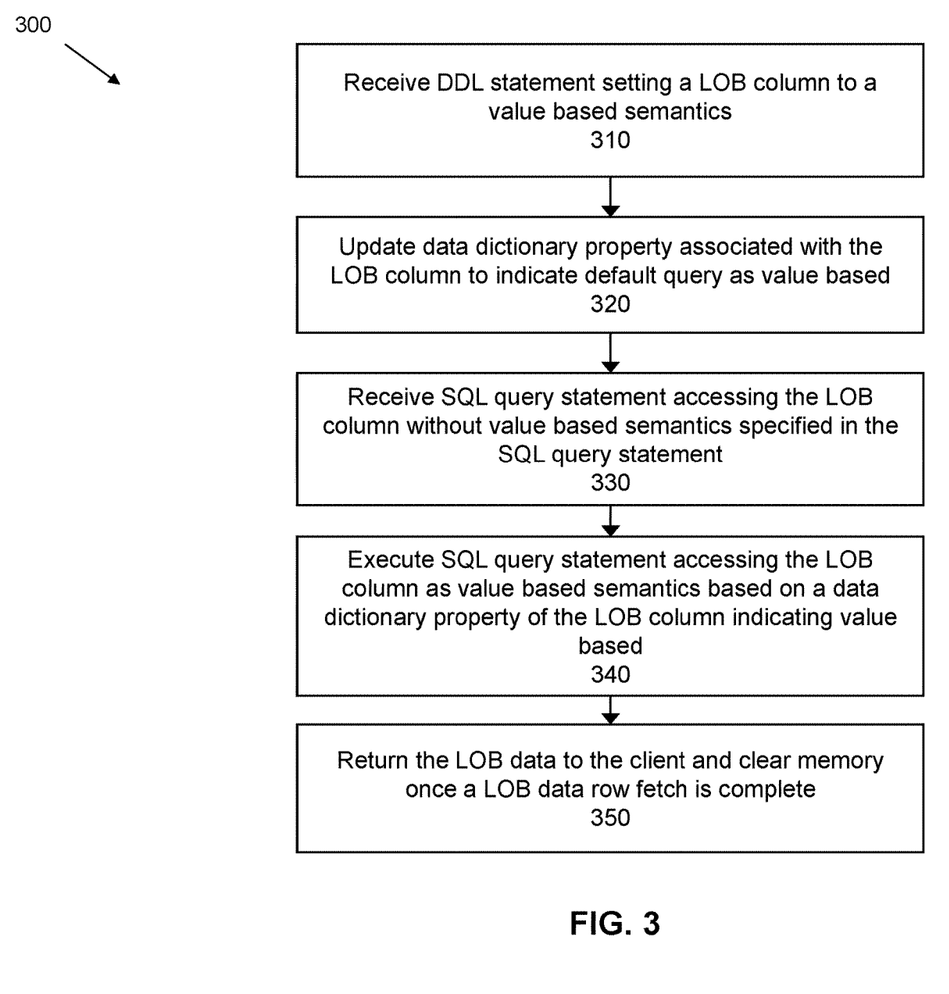
FIG. 3 illustrates a flowchart of an improved approach for accessing LOB data type column using a DDL statement.

FIG. 3 illustrates a flowchart 300 of an improved approach for accessing the LOB data type column using a DDL statement, according to some embodiments of the present disclosure. A LOB data type column may be configured to be accessed using Value based semantics. If not explicitly declared, a LOB data type column may originally be configured as using Reference based semantics (e.g., a lob locator is generated and returned to the client when data values of the LOB column are accessed). However, as discussed above, a client may explicitly declare to use Value based semantics for a particular LOB data type column. In one embodiment, a data definition language (DDL) statement may be received by the RDMBS that may include a SQL statement to set a data dictionary property of the LOB column to use Value based semantics for query access to the LOB column, as shown at 310.

At 320, a data dictionary property of the LOB column indicating a default query response of Value based is set so that query statements directed to accessing data values stored in the LOB column may be optimized/directed to return the data value of the LOB instead of a lob locator that references a storage location of the LOB data (e.g., Reference based). By using a DDL to configure a default query parameter of a LOB data type column to return a data value instead of a lob locator, any SQL query statements received for accessing the LOB data type column may be handled using Value based semantics even without using a special function included in the SQL query statement to explicitly access data of the LOB data type column using Value based semantics, as shown at 330.

At 340, the SQL query statement is executed to access the LOB data type column using Value based semantics even though the SQL query statement itself does not include the special function to indicate the client intends to access the LOB data type column using Value based. This is because the DDL statement had already set the data dictionary property of default query to Value based. Until the default query is set to Reference based, access requests made to the LOB data type column, whether the access request is within a SELECT statement or part of a WHERE clause, will be handled as Value based, even if the SQL query statement does not include the special function/construct (e.g., LOB_VALUE ( )). Because the default query parameter is set to Value based, the LOB data is returned to the client as shown at 350. Furthermore, one of the computing efficiency improvements achieved by access a LOB data type column using Value based semantics is that once the row fetch for the LOB data type column is completed, any resources (e.g., lob locator, if any, temporary memory for storing a portion of the LOB data corresponding to calculated data of the LOB data, etc.) associated with the accessing of the LOB data type column is released and cleared once the LOB data row fetch is completed, as also shown at 350.

In some embodiments, a different DDL statement may set the data dictionary property of the LOB column to indicate a default query response of Reference based to return a lob locator referencing the location of the LOB Data at a particular storage location (e.g., persistent storage or temporary storage location). In some embodiments, setting a LOB column to a Value based semantics may indicate that the data stored within the LOB column may be accessed in read-only mode. Setting the data dictionary property of the LOB column to Value based semantics in effect sets a default query of the LOB column to be Value based.

Figure 4:
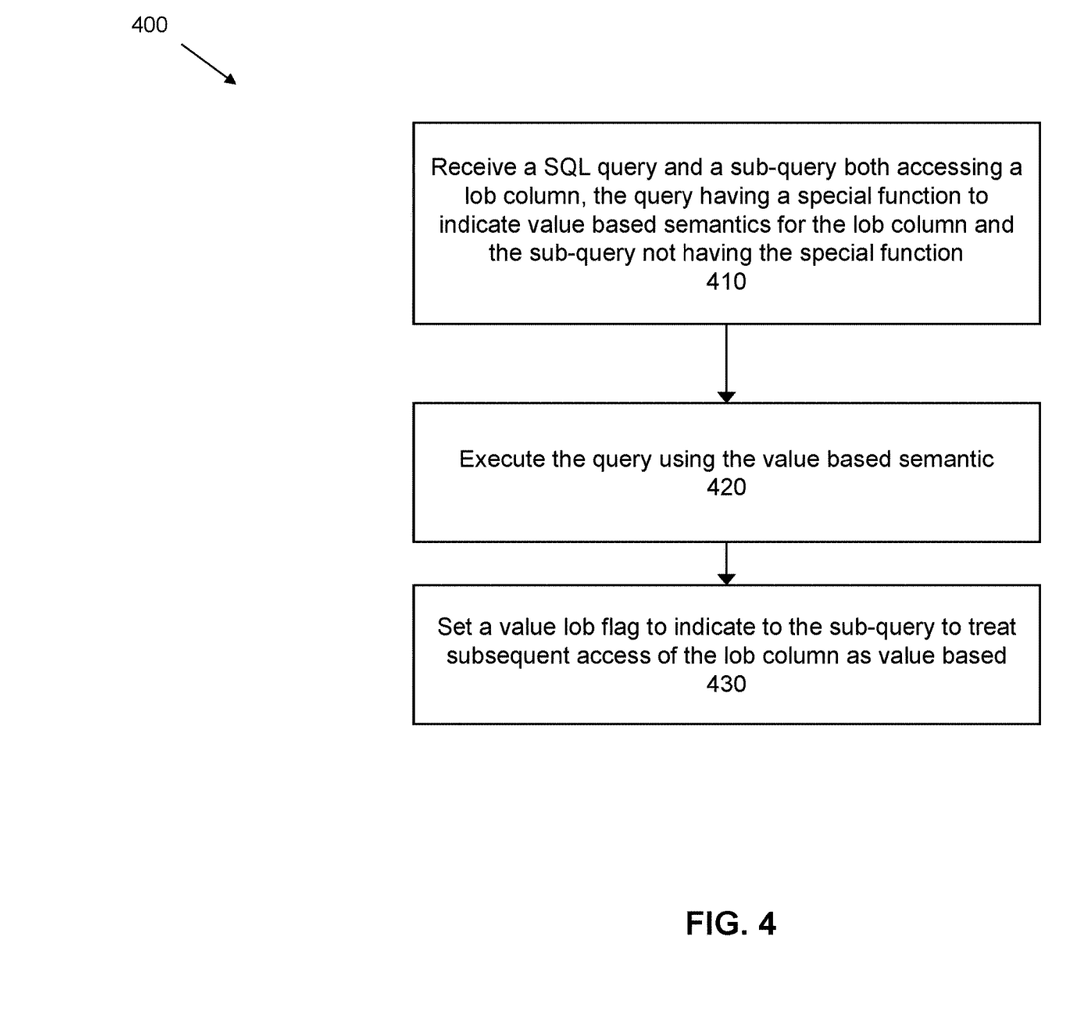
FIG. 4 illustrates a flowchart of an improved approach for accessing LOB data type column in nested/embedded/chained SQL statements, according to some embodiments of the present disclosure.

FIG. 4 illustrates a flowchart 400 of an improved approach for accessing a LOB data type column in nested/embedded/inner/chained SQL statements, according to some embodiments of the present disclosure. In one embodiment, a SQL Statement having a query and a sub-query both accessing a LOB data type column may be received by an SQL/query optimizer, as shown at 410. The LOB data type column may be indicated as a Value based semantics by the query (e.g., LOB_VALUE ( )) but the sub-query, accessing the LOB data type column, may not indicate the LOB data type column as a Value based semantics (e.g., no LOB_VALUE( ) function when referencing the LOB data type column by the sub-query). In this embodiment, there is no data dictionary property setting the LOB data type column to be Value based, and thus the LOB data type column is configured to use Reference based semantics to return a lob locator—instead of the LOB data value, unless otherwise explicitly overwritten by including the special function to treat the LOB as Value based.

At 420, the query is executed using Value based semantics. Results from the query (e.g., the LOB data value) may be passed to the sub-query for further processing. In this embodiment, since the query explicitly declared accessing the LOB data type column using Value based semantics, other queries within the operation tree accessing the same LOB data type column should also treat the LOB data type column as Value based. Thus, at 430, a value flag is set to indicate to the sub-query and any other queries associated to the query up and/or down the operation stack that Value based semantics is going to be used at the other queries associated to the query that accesses data from the LOB.

For example, for embedded queries, temporary queries, inner queries, other queries that also access the LOB column within a chain of nested/related queries that do not have Value based explicitly indicated in the respective queries, there is a value lob flag that may be set that may be passed with query data results to other queries within the embedded, temporary, inner queries to inform the next stage of query processing that the previous stage used Value based semantics and that the current stage and further stages should also use the same approach (e.g., Value based semantics) to access the LOB, wherein the LOB is a data type column of a database object (e.g., table, view, etc.) in an RDBMS.

Once a LOB data type column has been indicated by a client that the LOB data type column should be treated as Value based, other data access associated with and/or directed to the LOB data type column (e.g., other nested/embedded/inner/chained SQL statements associated to the SQL statement) should also use Value based when accessing the LOB data type column for consistency purposes.

Figure 5:
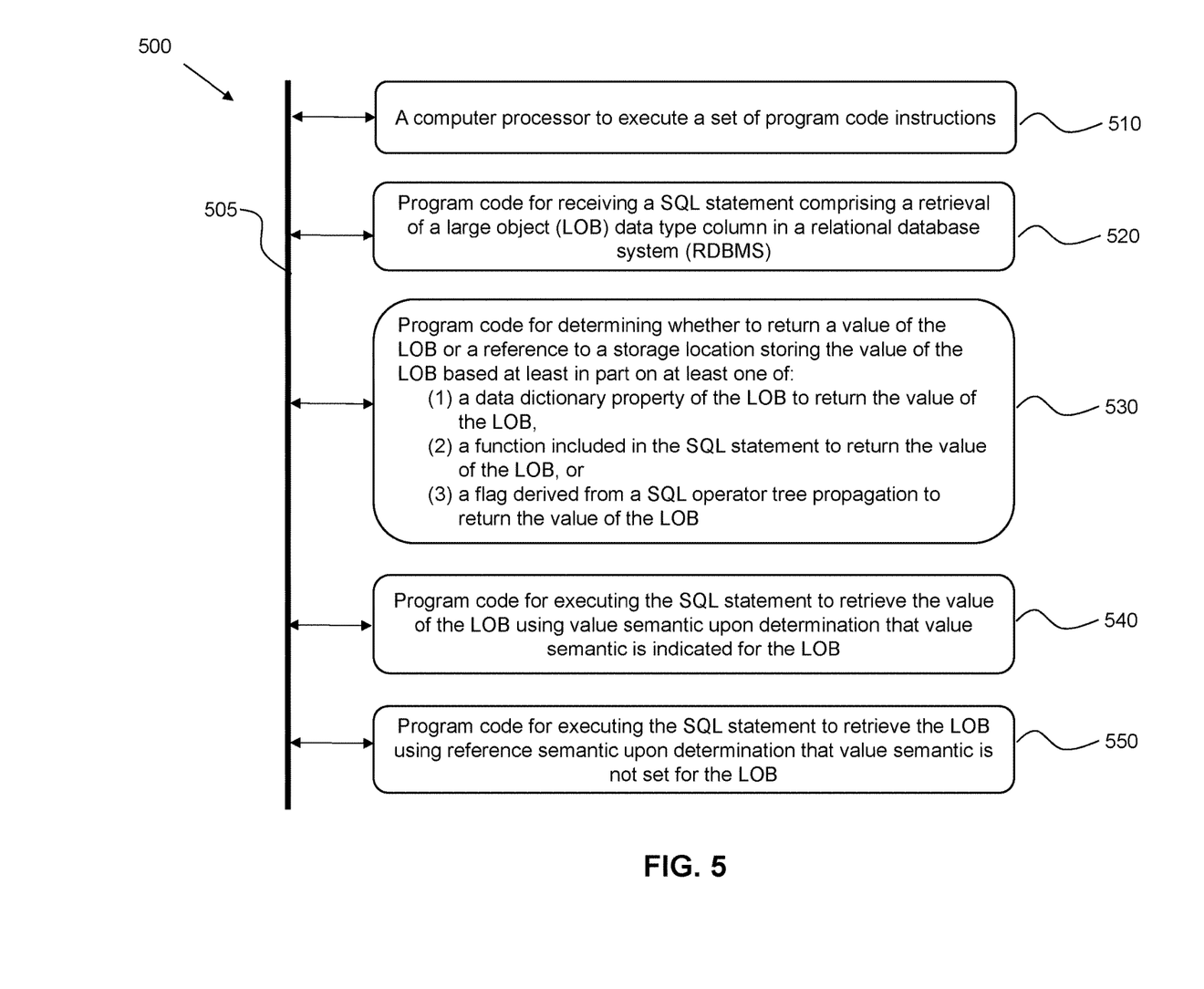
FIG. 5 illustrates system components as arrangements of computing modules that are interconnected so as to implement certain of the herein-disclosed embodiments.

FIG. 5 illustrates a system 500 as arrangements of computing modules that are interconnected so as to implement certain of the herein-disclosed embodiments. The system 500 is merely illustrative and other systems are possible. As an option, the system 500 may be implemented in the context of the architecture and functionality of the embodiments described herein. Of course, however, the system 500 or any operation therein may be carried out in any desired environment. The system 500 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with other operations over communication path 505. The modules of the system can, individually or in combination, perform method operations within system 500. Any operations performed within system 500 may be performed in any order unless as may be specified in the claims.

The shown embodiment implements a portion of a computer system, presented as system 500, comprising a computer processor to execute a set of program code instructions (module 510) and modules for accessing memory to hold program code instructions to perform: receiving a SQL statement comprising a retrieval of a large object (LOB) data type column in a relational database system (RDBMS) (module 520); determining whether to return a value of the LOB or a reference to a storage location storing the value of the LOB based at least in part on at least one of: (1) a data dictionary property of the LOB indicating a default query response of the value of the LOB, (2) a special function included in the SQL statement indicating returning the value of the LOB, or (3) a value flag indicating an operation is receiving a result from an operator that has retrieved the value of the LOB (module 530); executing the SQL statement to retrieve the LOB using value semantic upon determination that value semantic is indicated for the LOB (module 540); and executing the SQL statement to retrieve the LOB using reference semantic upon determination that value semantic is not set for the LOB (module 550).

Variations of the foregoing may include more or fewer of the shown modules and variations may perform more or fewer (or different) steps, and/or may use data elements in more, or in fewer or different operations.

Some embodiments include variations where a quasi locator may be included with a Value based result to indicate to the client that the LOB data returned to the client from the server (e.g., RDBMS) is complete in the one response from the server. For example, when a pre-fetch buffer of the client is larger than the size of the LOB data type column, the entire LOB data may be included in the pre-fetch buffer returned to the client in one response. Including a quasi locator with the response may indicate to the client that the entire LOB data is included in the response received from the server and there is no subsequent fetch(es) for the LOB data.

Some embodiments include variations where the DDL and DML for indicating Value based semantics are applicable to database view objects as well as database table objects.

What has been disclosed are improved systems, computer program products, and methods for enhancing DDL and SQL query statements for an RDBMS client to access LOB data types with varchar/raw kind of semantics and performances. In particular, the client may indicate in a DDL statement or SQL query statement how the client would like to access the data stored in a LOB data type column. For example, a client may elect to by-pass and not use the conventional mechanisms of accessing a LOB data type. Instead, the client may indicate in the SQL statement for a database optimizer to treat the data stored in the LOB data type column similarly to how a varchar/raw (e.g., scan the table for the LOB data and return the LOB data to the client and not go through the highly expensive and latency driven process of creating a LOB locator for the client and requiring the client to make a second request using the LOB locator to access the LOB data). By returning the actual data of the LOB data type column to the client for a particular row instead of a reference to a storage location of the LOB data, other memory optimizations may be achieved such as garbage collecting being performed immediately upon completion of a row fetch of temporary LOBs.

System Architecture Overview

Figure 6:
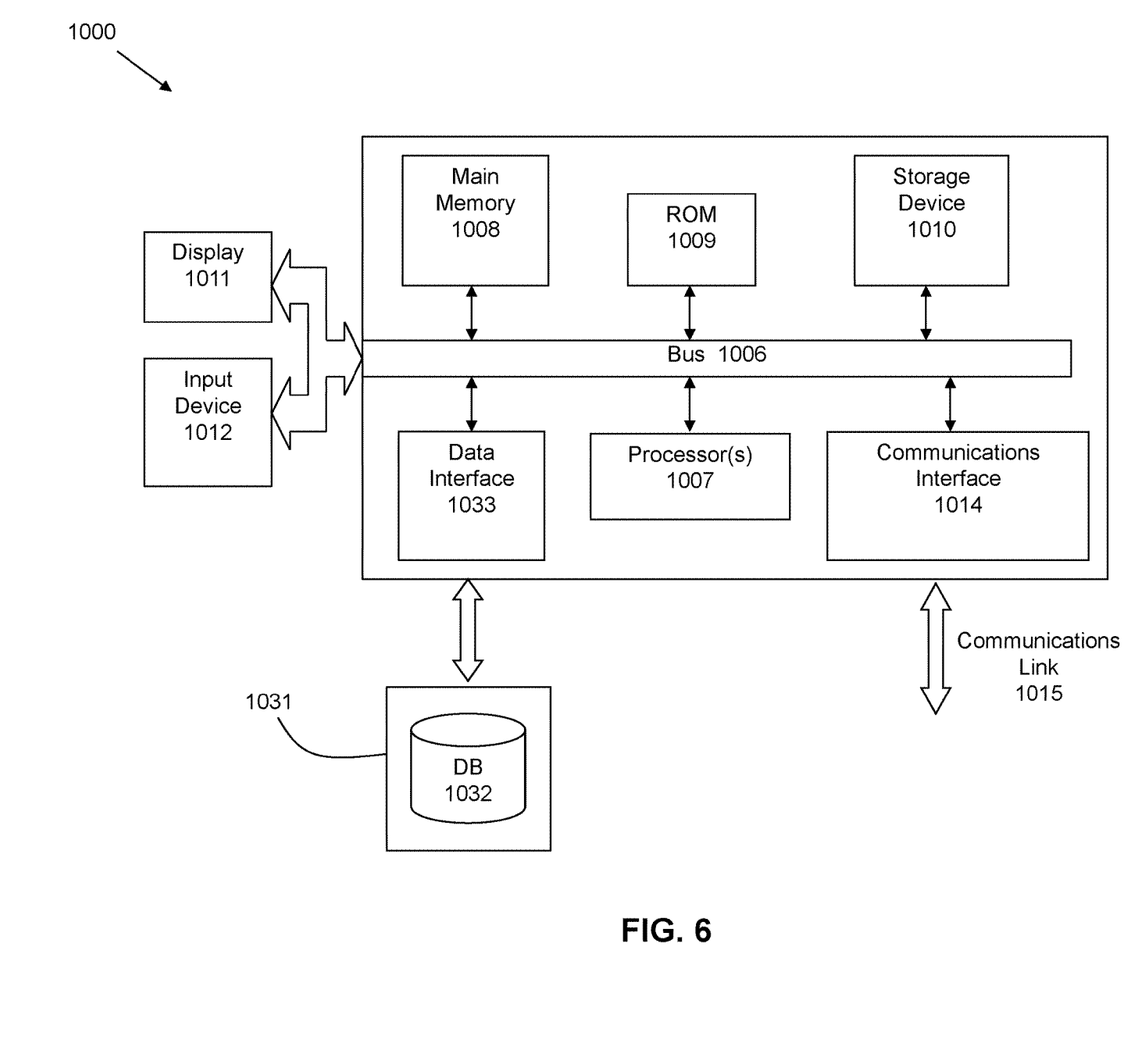
FIG. 6 is a block diagram of an illustrative computing system suitable for implementing an embodiment of the present disclosure.

FIG. 6 is a block diagram of an illustrative computing system 1000 suitable for implementing an embodiment of the present disclosure. Computer system 1000 includes a bus 1006 or other communication mechanism for communicating information, which interconnects subsystems and devices, such as processor 1007, system memory 1008 (e.g., RAM), static storage device 1009 (e.g., ROM), disk drive 1010 (e.g., magnetic or optical), communication interface 1014 (e.g., modem or Ethernet card), display 1011 (e.g., CRT or LCD), input device 1012 (e.g., keyboard), data interface 1033, and cursor control.

According to some embodiments of the disclosure, computer system 1000 performs specific operations by processor 1007 executing one or more sequences of one or more instructions contained in system memory 1008. Such instructions may be read into system memory 1008 from another non-transitory computer readable/usable medium, such as static storage device 1009 or disk drive 1010. In alternative embodiments, hard-wired circuitry may be used in place of or in combination with software instructions to implement the disclosure. Thus, embodiments of the disclosure are not limited to any specific combination of hardware circuitry and/or software. In some embodiments, the term "logic" shall mean any combination of software or hardware that is used to implement all or part of the disclosure.

The term non-transitory "computer readable medium" or "computer usable medium" as used herein refers to any medium that participates in providing instructions to processor 1007 for execution. Such a medium may take many forms, including but not limited to, non-volatile media and volatile media. Non-volatile media includes, for example, optical or magnetic disks, such as disk drive 1010. Volatile media includes dynamic memory, such as system memory 1008.

Common forms of non-transitory computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the disclosure, execution of the sequences of instructions to practice the disclosure is performed by a single computer system 1000. According to other embodiments of the disclosure, two or more computer systems 1000 coupled by communication link 1010 (e.g., LAN, PTSN, or wireless network) may perform the sequence of instructions required to practice the disclosure in coordination with one another.

Computer system 1000 may transmit and receive messages, data, and instructions, including program, e.g., application code, through communication link 1015 and communication interface 1014. Received program code may be executed by processor 1007 as it is received, and/or stored in disk drive 1010, or other non-volatile storage for later execution. A database 1032 in a storage medium 1031 may be used to store data accessible by the system 1000 via data interface 1033.

Figure 7:
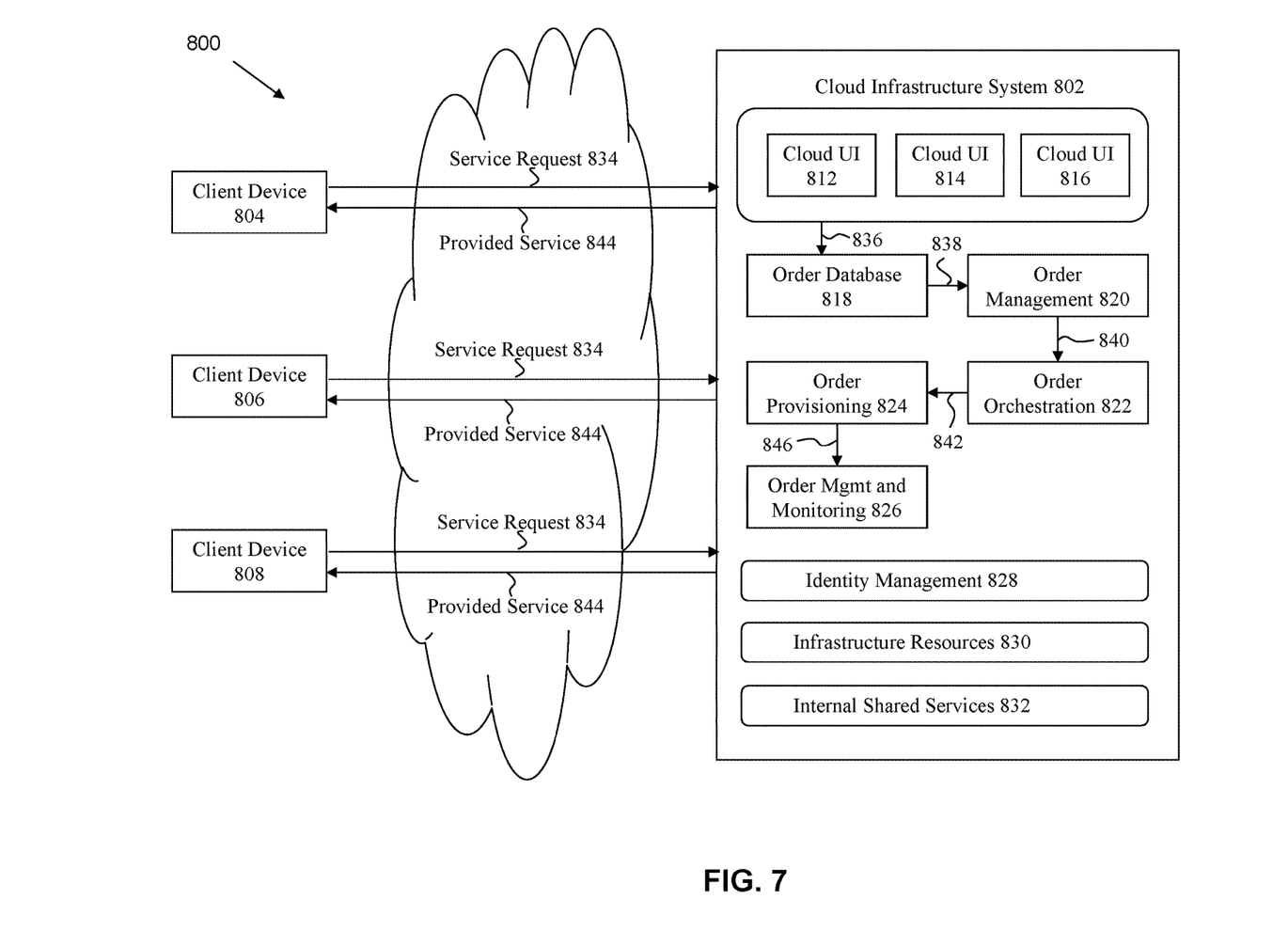
FIG. 7 is a block diagram of one or more components of a system environment by which services provided by one or more components of an embodiment system may be offered as cloud services, in accordance with an embodiment of the present disclosure.

FIG. 7 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application, or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the disclosure. In some other embodiments, cloud infrastructure system 802 may have more or fewer components than shown in the figure, may combine two or more components, or may have a different configuration or arrangement of components. Client computing devices 804, 806, and 808 may be devices similar to those described above for FIG. 6. Although system environment 800 is shown with three client computing devices, any number of client computing devices may be supported. Other devices such as devices with sensors, etc. may interact with cloud infrastructure system 802.

Network(s) 810 may facilitate communications and exchange of data between client computing devices 804, 806, and 808 and cloud infrastructure system 802. Each network may be any type of network familiar to those skilled in the art that can support data communications using any of a variety of commercially-available protocols. Cloud infrastructure system 802 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that allow organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that allow organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may allow a first set of users in a first time zone to utilize resources of the cloud infrastructure system for a specified number of hours and then allow the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In operation 834, a customer using a client device, such as client computing devices 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816. At operation 836, the order is stored in order database 818. Order database 818 can be one of several databases operated by cloud infrastructure system 802 and operated in conjunction with other system elements. At operation 838, the order information is forwarded to an order management module 820. In some instances, order management module 820 may be configured to perform billing and accounting functions related to the order, such as verifying the order, and upon verification, booking the order. At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 allows the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 allows the allocation of resources for the services ordered by the customer. Order provisioning module 824 provides a level of abstraction between the cloud services provided by cloud infrastructure system 802 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client computing devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 802 may include an identity management module 828. Identity management module 828 may be configured to provide identity services, such as access management and authorization services in cloud infrastructure system 802. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A method comprising:
   receiving a SQL statement comprising a retrieval of a large object (LOB), wherein the LOB is stored in a LOB column corresponding to a LOB data type in a relational database system (RDBMS);
   determining whether to return a value of the LOB or a reference to a storage location storing the value of the LOB by using a value-based construct inserted into the SQL statement to indicate to the RDBMS that the value of the LOB is to be returned instead of returning the reference to the storage location of the LOB; and upon determination that the value of the LOB is to be returned based upon the value-based construct inserted into the SQL statement, executing the SQL statement to retrieve the value of the LOB.

2. The method of claim 1, wherein a small to medium size object is stored in the LOB.

3. The method of claim 1, wherein a data dictionary property of the LOB column is configured based at least in part on a data definition language (DDL) statement.

4. The method of claim 3, wherein the DDL statement comprises an alter table command or a create table command.

5. The method of claim 1, wherein a SQL operator tree propagation is performed that corresponds to an embedded query statement that has already determined to return the value of the LOB, and the SQL operator tree propagation indicates a SQL operation level that, when executed, sets a flag to inform an embedded query in the SQL statement to use value-based semantics.

6. The method of claim 1, wherein the value-based construct corresponds to a function that is included in a select statement and/or a where clause of the SQL statement.

7. The method of claim 1, wherein a lob locator and a portion of the value of the LOB is returned when a data size of the LOB is larger than a pre-fetch buffer size of a client.

8. The method of claim 1, wherein a temporary LOB is garbage collected upon completion of a row level fetch of the value of the LOB stored in the temporary LOB.

9. A system comprising:
a processor; and
a memory to hold a set of program code instructions, in which the set of program code instructions comprises program code to perform:
receiving a SQL statement comprising a retrieval of a large object (LOB), wherein the LOB is stored in a LOB column corresponding to a LOB data type in a relational database system (RDBMS),
determining whether to return a value of the LOB or a reference to a storage location storing the value of the LOB by using a value-based construct inserted into the SQL statement to indicate to the RDBMS that the value of the LOB is to be returned instead of returning the reference to the storage location of the LOB; and
upon determination that the value of the LOB is to be returned based upon the value-based construct inserted into the SQL statement, executing the SQL statement to retrieve the value of the LOB.

10. The system of claim 9, wherein a small to medium size object is stored in the LOB.

11. The system of claim 9, wherein a SQL operator tree propagation is performed that corresponds to an embedded query statement that has already determined to return the value of the LOB, and the SQL operator tree propagation indicates a SQL operation level that, when executed, sets a flag to inform an embedded query in the SQL statement to use value-based semantics.

12. The system of claim 9, wherein the value-based construct corresponds to a function that is included in a select statement and/or a where clause of the SQL statement.

13. The system of claim 9, wherein a lob locator and a portion of the value of the LOB is returned when a data size of the LOB is larger than a pre-fetch buffer size of a client.

14. The system of claim 9, wherein a temporary LOB is garbage collected upon completion of a row level fetch of the value of the LOB stored in the temporary LOB.

15. A computer program product including a non-transitory computer readable medium having instructions which, when executed by a processor, causes the processor to perform:
receiving a SQL statement comprising a retrieval of a large object (LOB), wherein the LOB is stored in a LOB column corresponding to a LOB data type in a relational database system (RDBMS);
determining whether to return a value of the LOB or a reference to a storage location storing the value of the LOB by using a value-based construct inserted into the SQL statement to indicate to the RDBMS that the value of the LOB is to be returned instead of returning the reference to the storage location of the LOB; and
upon determination that the value of the LOB is to be returned based upon the value-based construct inserted into the SQL statement, executing the SQL statement to retrieve the value of the LOB.

16. The computer program product of claim 15, wherein a small to medium size object is stored in the LOB.

17. The computer program product of claim 15, wherein a SQL operator tree propagation is performed that corresponds to an embedded query statement that has already determined to return the value of the LOB, and the SQL operator tree propagation indicates a SQL operation level that, when executed, sets a flag to inform an embedded query in the SQL statement to use value-based semantics.

18. The computer program product of claim 15, wherein the value-based construct corresponds to a function that is included in a select statement and/or a where clause of the SQL statement.

19. The computer program product of claim 15, wherein a lob locator and a portion of the value of the LOB is returned when a data size of the LOB is larger than a pre-fetch buffer size of a client.

20. The computer program product of claim 15, wherein a temporary LOB is garbage collected upon completion of a row level fetch of the value of the LOB stored in the temporary LOB.

* * * * *